United States Patent [19]

Weinberg et al.

[11] Patent Number: 5,483,549
[45] Date of Patent: Jan. 9, 1996

[54] RECEIVER HAVING FOR CHARGE-COUPLED-DEVICE BASED RECEIVER SIGNAL PROCESSING

[75] Inventors: Aaron Weinberg, Potomac, Md.; Kenneth D. Cunningham, Sterling, Va.; Daniel Urban, Silver Spring, Md.; Matthew S. Simmons, Centreville, Va.; Thomas Land, Great Falls, Va.; Martin W. Tucker, Reston, Va.

[73] Assignee: Stanford Telecommunications, Inc., Reston, Va.

[21] Appl. No.: 205,496

[22] Filed: Mar. 4, 1994

[51] Int. Cl.⁶ ...................................................... H04B 1/69
[52] U.S. Cl. .............................................. 375/200; 380/34
[58] Field of Search ................................... 375/1; 380/34

[56] References Cited

U.S. PATENT DOCUMENTS

| | | |
|---|---|---|
| 4,112,372 | 9/1978 | Holmes et al. .................... 375/1 X |
| 4,553,101 | 11/1985 | Mathis ................................. 375/1 X |
| 5,126,682 | 6/1992 | Weinberg et al. . |
| 5,216,691 | 6/1993 | Kaufmann ............................. 375/1 |
| 5,276,705 | 1/1994 | Higgins ................................. 375/1 |

*Primary Examiner*—David C. Cain
*Attorney, Agent, or Firm*—Jim Zegeer

[57] ABSTRACT

This invention relates to a novel receiver architecture, the Charge-Coupled-Device Integrated Receiver (IR), which simplifies electronic circuitry requirements and reduce baseband processing rates through efficient signal processing. The focus of this receiver's design is its use of Charge-Coupled-Device (CCD) technology. By using CCD's, in conjunction with other key technologies, to implement the signal processing techniques disclosed herein, it is possible to provide a receiver that is suitable for a wide range of applications (e.g., communications, sonar, radar, etc.). Information is presented which outlines the fundamental receiver architecture that is appropriate for a wide range of commercial services (e.g., AMPS, NAMPS, Digital Cellular, GSM, PCS, ISM, CT1, CT2, etc.) Furthermore, tile versatility of this architecture makes it suited for uses ranging from simple AM/FM receivers to complex high-order modulation TDMA/CDMA receivers.

12 Claims, 10 Drawing Sheets

RECEIVER HAVING FOR CHARGE-COUPLED-DEVICE BASED RECEIVER SIGNAL PROCESSING

BACKGROUND AND BRIEF DISCUSSION OF THE INVENTION

As the use of digital communications has increased over the past few decades, engineers have been faced with the challenge of building receivers that are of a practical size and reasonable cost. While driven in the past to reduce size and cost, a large portion of the marketplace was composed of users—such as the military—that required small to moderate quantities of a particular receiver model. In addition, requirements for substantial capability/functionality and extreme environmental/reliability characteristics resulted in receivers that were large and bulky: albeit they were virtually "bulletproof". The marketplace has now changed and a large part of the user community is composed of the commercial sector. As such, the requirements placed on communication equipment have also changed with increased pressure to meet price points acceptable for high volume product markets. Within this market, simpler receivers with very focused functionality, low power consumption, and reduced size are desired, and the object of the invention is to provide receivers meeting this criteria.

The receiver disclosed herein is called the Integrated Receiver (IR.) The name reflects both its inherent nature for overlapping several receiver processes within a common processing path and its amenability for implementation using highly integrated circuitry. The IR's operating advantages stem from its unique signal processing characteristics that are achieved through novel use of charge coupled devices (CCD) technology and integrated tracking loop techniques.

CCD technology has been used for many years. Probably, its most notable application has been in the camera industry. However, recent advances in CCD design and fabrication have led designers to consider new uses for this technology. For example, see Weinberg et al. U.S. Pat. No. 5,126,682, which relates to a demodulation system incorporating CCD devices, which is incorporated herein by reference. The present invention is directed to receivers for communication, sonar and radar applications.

The CCD is a combination of analog and digital circuitry whose properties exploit the best from both worlds. Its analog input matches well with signals provided by receiver front-ends and the device is capable of directly producing a digital output when integrated with an A/D converter. Furthermore, the device may be controlled and clocked digitally thereby providing a natural interface with a system processor. When configured as a transversal filter (see U.S. Pat. No. 5,126,682), the CCD offers several key features including:
Wide input dynamic range.
Variable clocking speeds.
Variable/fixed tap weights.
Multibit tap weights.
Large number of stages.
Length control.
Auxiliary processing functions.

Given the features noted above, the CCD becomes an extremely useful device for receivers as disclosed herein. Through its proper use, the device can:
Filter,
Demodulate,
Store samples,
Decimate,
Despread,
Tune,
Amplify/Attenuate,
incoming signals. The IR according to this invention exploits the CCD's features so as to simplify digital signal processing requirements within the receiver.

DESCRIPTION OF THE DRAWINGS

The above and other objects, advantages and features of the invention will become more apparent when considered with the following specification and accompanying drawings wherein.

DETAILED DESCRIPTION OF THE INVENTION

The specific composition of an Integrated Receiver is very dependent on the targeted application. Data rates, coding requirements, performance (e.g., acquisition speed), FDMA/TDMA/CDMA operation, carrier frequency, tuning range, input dynamic range, configurability, reliability, environment, unit cost, etc. all have a bearing on design selections. Because there are so many variables to consider, the following IR description is constrained to the most fundamental aspects of the invention.

Figure 1:
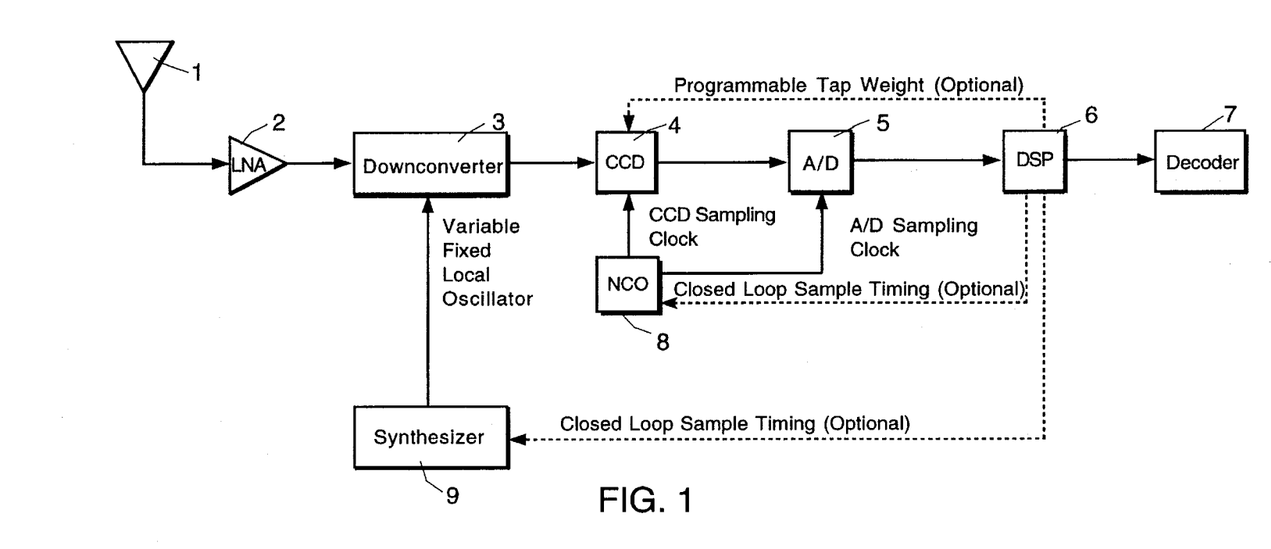
FIG. 1 is a diagrammatic overview of the fundamental Integrated Receiver architecture incorporating the invention.

The fundamental IR architecture is depicted in FIG. 1. Note that a specific IR implementation might require fewer (or perhaps additional) components. For instance, downconverter 3 and CCD 4 (and digital signal processor (DSP) 6 in some instances) have a frequency translation capability. As a result, certain applications could have carrier frequency assignments that would preclude one or more of these components while still using IR signal processing. In contrast to these reductions in IR complexity, one may to add/enhance components in order to satisfy other requirements. For instance, built-in performance monitoring, higher order modulation (with perhaps frequency hopping), and special interfacing circuitry could all be added within the scope of the IR architecture of this invention.

Antenna 1 and Low Noise Amplifier (LNA) 2 form the IR's front end. Their selection is based upon link budget calculations for a specific application. Output from LNA 2 is passed to Downconverter 3. Downconverter 3 can be implemented in many ways. For example, it can translate the received RF by mixing with a fixed or variable local oscillator (LO) from Synthesizer 9. It could also use a sample and hold technique to subsample the RF and produce an aliased signal at the desired IF. In addition to frequency translation, the downconverter can provide gain control and filtering as required.

The IF produced by Downconverter 3 is passed to CCD 4. The CCD is clocked by Numerically Controlled Oscillator (NCO) 8. The CCD may also accept tap weights from Digital Signal Processor (DSP) 6 in some applications. The analog output of the CCD is passed to Analog to Digital Converter (A/D) 5. Finally, the digitized signal is passed to DSP 6. DSP 6 executes the IR acquisition and tracking algorithms and updates feedback paths to Synthesizer 9 and NCO 8 as needed. Tap weight generation is also performed by DSP 6 as well as generating all control signals required for receiver operation. Decoder 7 performs any block or viterbi decoding, descrambling, differential decoding and deinterleaving that may be required.

Figure 2:
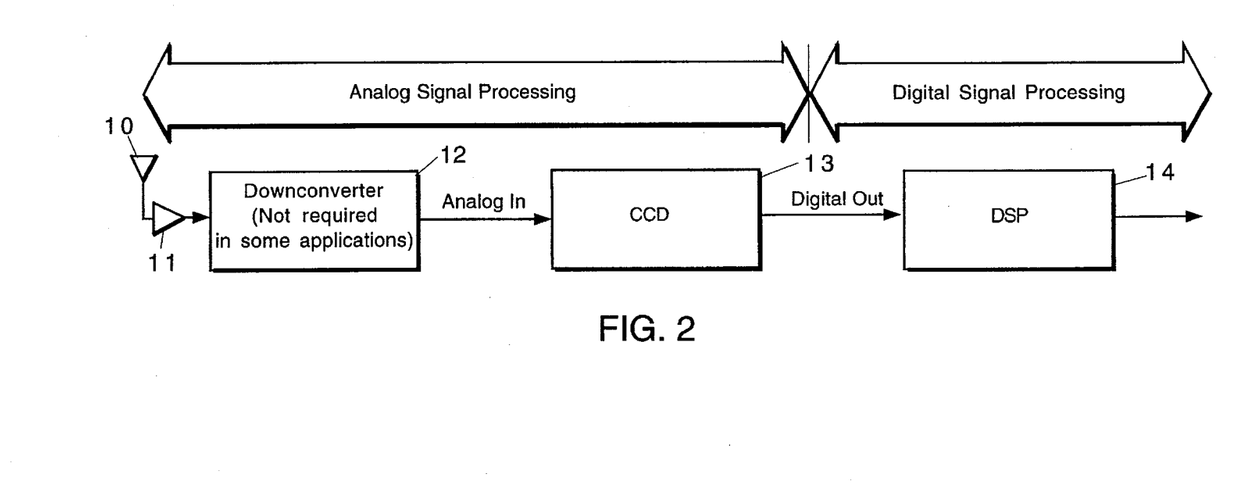
FIG. 2 is an overview of the Integrated Receiver signal processing according to the invention.

An overview of the signal processing performed within the IR architecture of this invention is depicted in FIG. 2. This figure illustrates a receiver configuration employing IF sampling. Note that the single signal path beginning with antenna 10, amplifier 11, and extending through CCD 13 provides all the input necessary to perform the digital signal processing. This is unlike classical designs that would separate the various acquisition and tracking functions thereby requiring additional circuitry to process the received signal.

Figure 3:
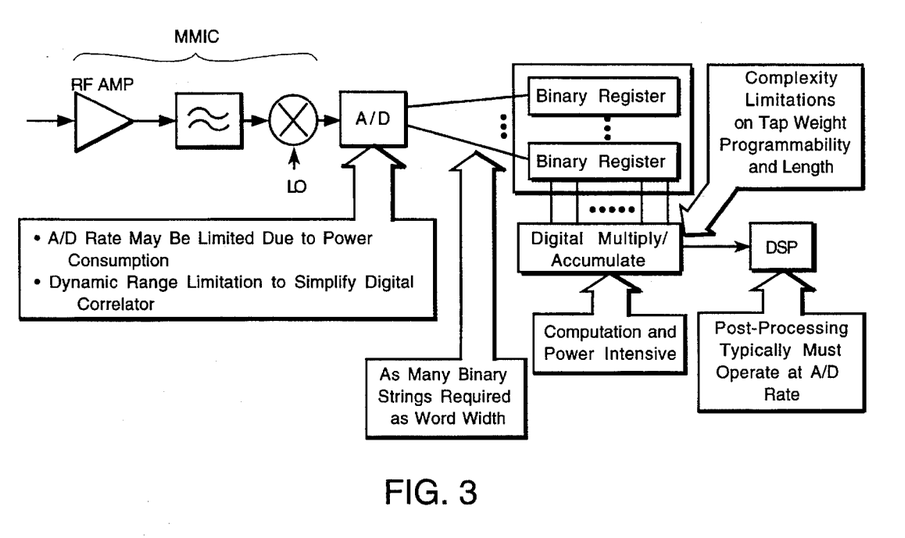
FIG. 3 shows the characteristics of conventional digital matched filtering and correlation.
Figure 4:
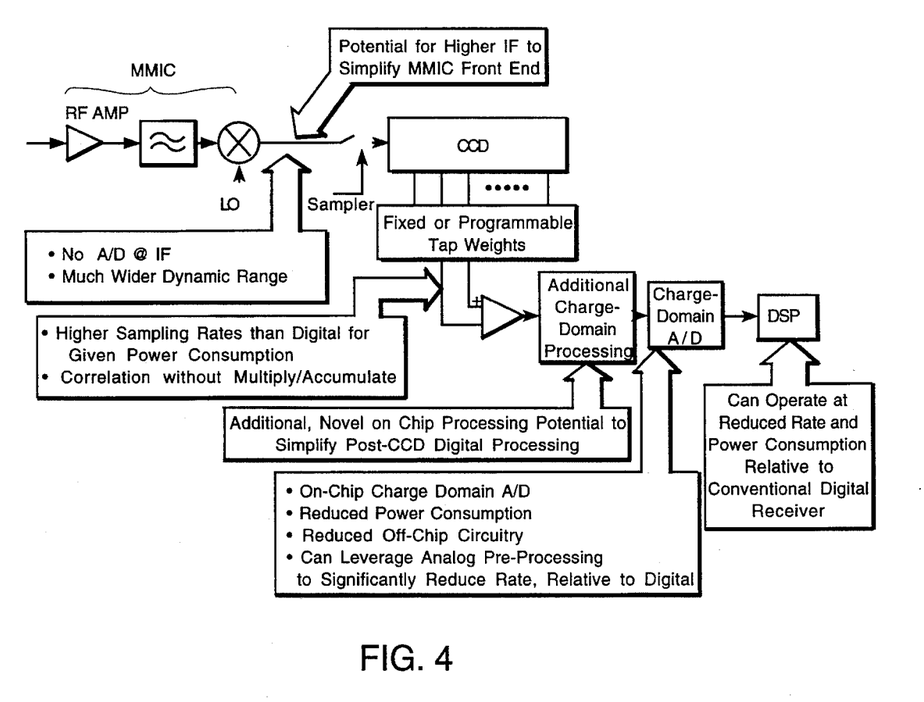
FIG. 4 shows the characteristics of CCD matched filtering and correlation.

Extensive signal processing is accomplished with the CCD. For example, a 512 stage CCD with 256 tapped stages performs the equivalent of about 6 billion floating point multiply/accumulate operations each second when clocked at a 24 MHz rate. This high processing capacity enables the CCD to collapse the bandwidth of its input signal so as to dramatically slow down processing rates of the subsequent digital signal processing. FIGS. 3 and 4 contrast conventional digital technology and CCD technology for receiver applications.

The following is a summary of the key functions performed by the CCD.

Demodulation

Figure 5:
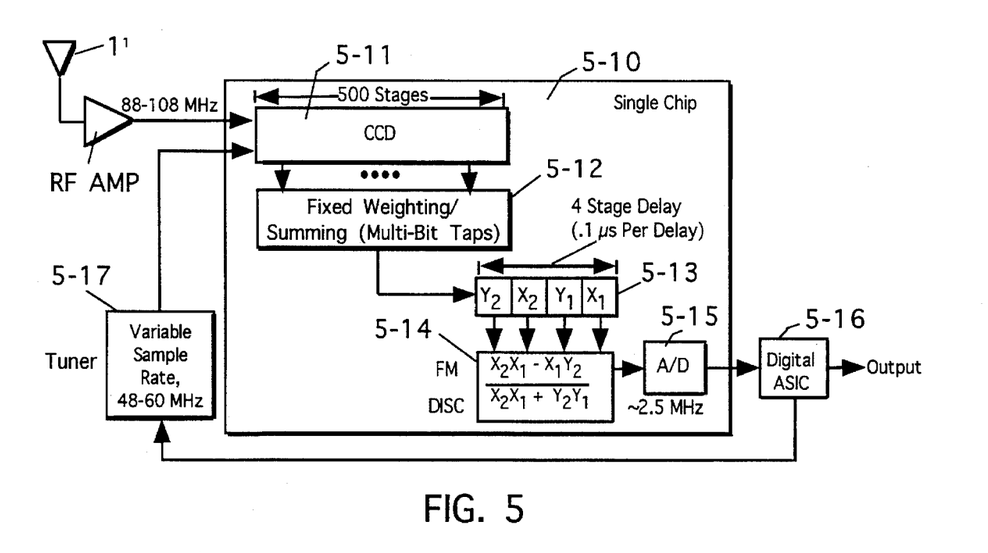
FIG. 5 illustrates a CCD-based FM receiver design.

Because of the CCD's variable clocking rate, the recovered waveform can be aligned within the CCD so that the tap weights cancel the carrier component. This process acts to demodulate the recovered waveform. For example, the carrier component of a BPSK waveform can be removed by correlating its peaks and zero crossings with tap weights of the form $a_1, 0, +a_2, 0, -a_3, 0, +a_4, 0, \ldots$. Note that this sequence generates both inphase and quadrature components within a single path. In general, the same applies for higher order modulation. Additionally, discriminators may also be imbedded within the CCD for detection of analog modulated signals. FIG. 5 illustrates an example of this. FIG. 5 shows a single integrated circuit CCD 5–10 having a CCD portion 5–11 having, for example, 500 stages with the stages being fed to a fixed weighting/summer 5–12 whose output is fed to a four stage delay portion 5–13, which, in turn, supplies an FM discriminator portion 5–14. The analog output is fed to analog-to-digital converter portion 5–15. The output from chip 5–10 is supplied to a digital application specific integrated circuit chip 5–16. One output is supplied to tuner 5–17, which provides a variable sampling rate (48–60 MHz) to the CCD portion 5–11. Thus, this single CCD chip incorporates change domain processing and embeds multiple functions in the single chip and eliminates components. There is no mixing and narrow band filtering. The CCD serves as the downconverter/narrow band-tuned FIR filter, FM discriminator on chip (charge domain) and the chip incorporates analog-to-digital (A/D) on chip and at a low rate due to CCD pre-processing. The single chip can also serve as the front-end for multiple applications, embedded in tailored application specific integrated circuit chips, for example, as in a mono or stereo commercial FM receiver, for sub-carrier processing (e.g., for IVHS). The invention can be used in digital audio broadcast systems employing frequency hopping as disclosed in Schuchman et al. U.S. Pat. No. 5,283,780, incorporated herein by reference.

Filtering

The CCD is a tapped analog delay line. This is the same configuration that is used for correlators and finite impulse response filters. The filter characteristics of this device are determined by the tap weights contained in the CCD. Filtering for PN despreading using ternary tap weights provides a SinX/X roll-off while multibit tap weights may be used for sharp cut-off to guard against adjacent channel interference— important for such applications as GSM. Further influencing the filter is the clock rate applied to the CCD which can be used to adjust the filter bandwidth and center frequency. Adjustment of the filtering characteristics by changing the sample rate is an important feature in multichannel applications.

Decimation

Typically, the CCD is configured to span a portion of a symbol period. In some cases it may be necessary to sample the recovered waveform at a rate much higher than the symbol rate (e.g. CDMA signals where the chip rate determines the sample rate). The CCD permits decimation of the waveform by collapsing the output rate of the CCD by a factor that is proportional to the length of the CCD. Thus the CCD may be clocked at a very high rate but its effective output rate is much closer to the actual symbol rate.

Sample Storage

The CCD is capable of holding analog signal samples for relatively long periods of time. This feature enables designers to collect samples at very high rates and then read them from the CCD at substantially lower rates. This can be accomplished by suspending the CCD clock once the samples are collected or by adding sample and hold circuits after the CCD summation node for the purpose of capturing only selected data.

Despreading

CDMA applications require correlation of a recovered waveform with a locally generated code sequence. While this process is an extremely effective communication technique, the process of aligning the codes during the initial acquisition phase can be very computationally intensive. The CCD's correlation architecture is well suited for this task. Programmable ternary (or higher order) weighting at the taps facilitates code alignment and length control for matching to the data rates of interest.

Tuning

Communication systems with multiple adjacent channels are quite common. Channel selection is typically accomplished by adjusting the receiver LO so as to move the desired channel into the pass band. When using IF sampling techniques, the CCD is able to perform this function as well. By adjusting the CCD's clock rate, it is possible to match with the recovered waveform's carrier and thereby select a desired channel. This effectively tunes to filter to match the selected carrier frequency. This process may greatly reduce or even eliminate the need for a variable LOs.

Amplify/Attenuate

The CCD does much of its signal processing in the analog domain. As such, it is possible to adjust signal levels (and biases) as needed. Functions such as gain control may benefit from this feature.

Figure 6A:
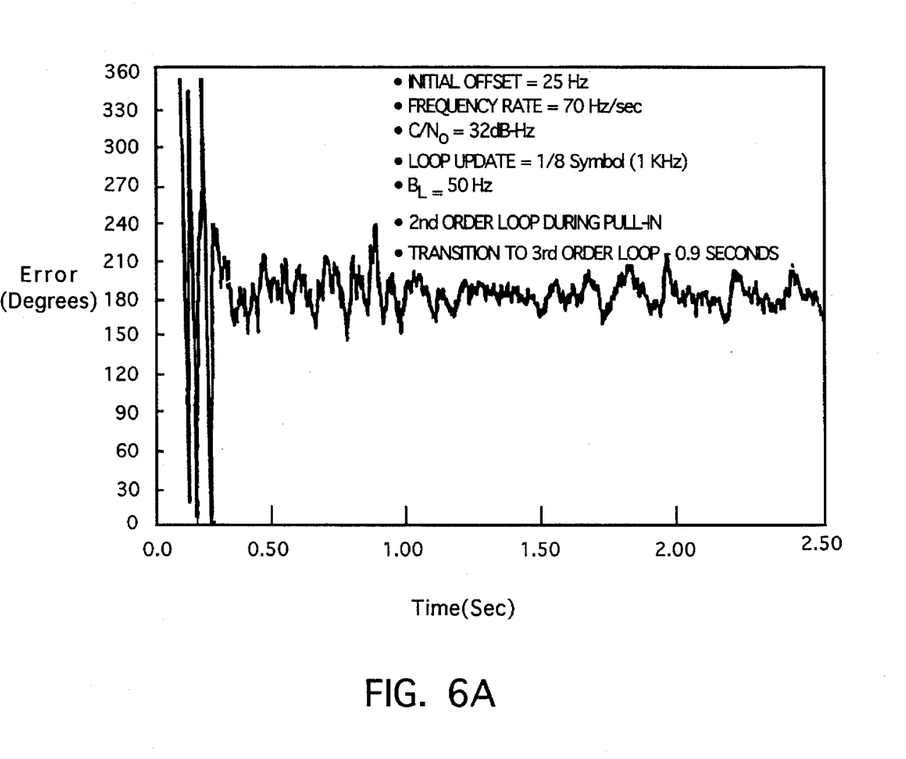
FIGS. 6a, 6b and 6c show data, collected from an Integrated Receiver prototype for a CDMA application, that illustrates closure of the three tracking loops (PN, carrier, and symbol) using the common output provided by the matched filter.
Figure 6B:
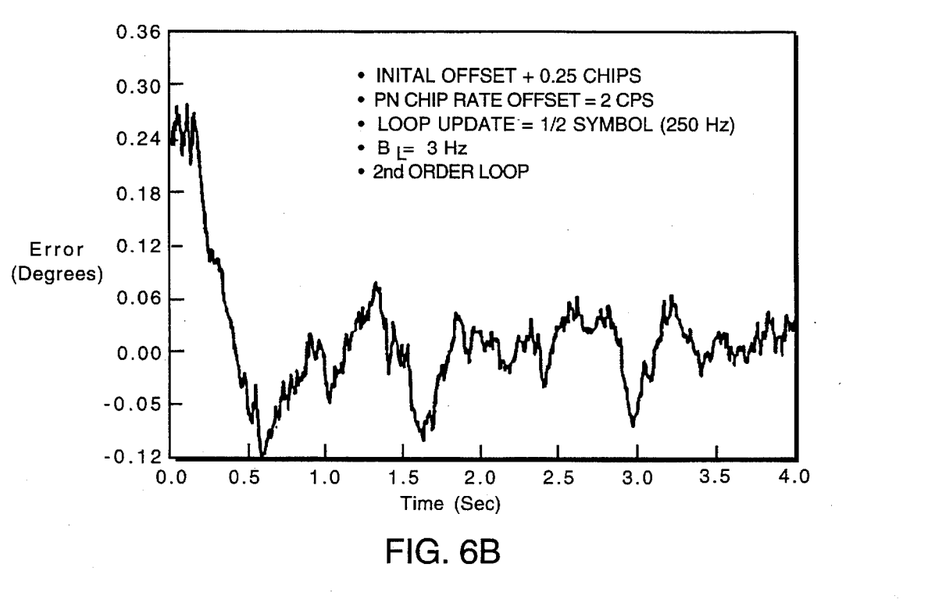
Figure 6C:
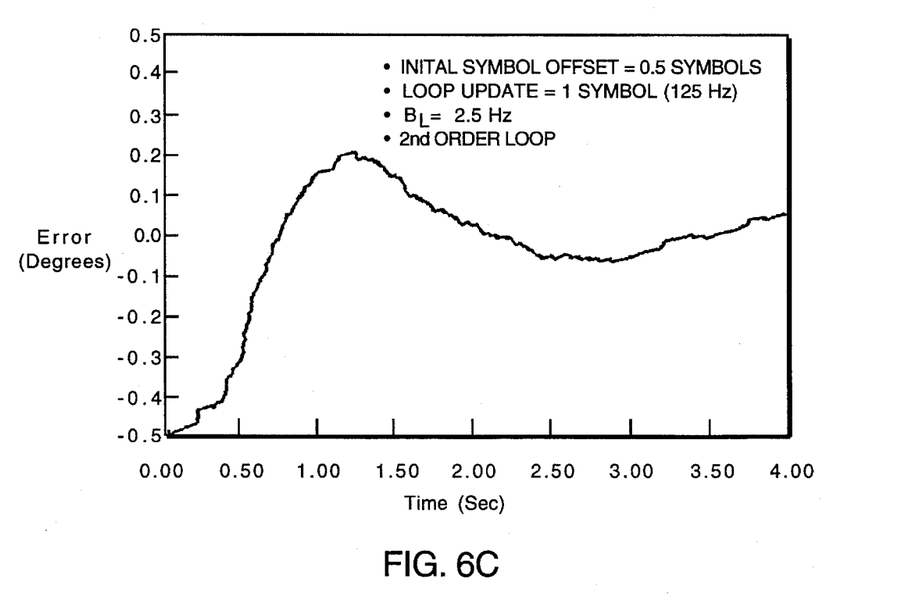
Figure 7:
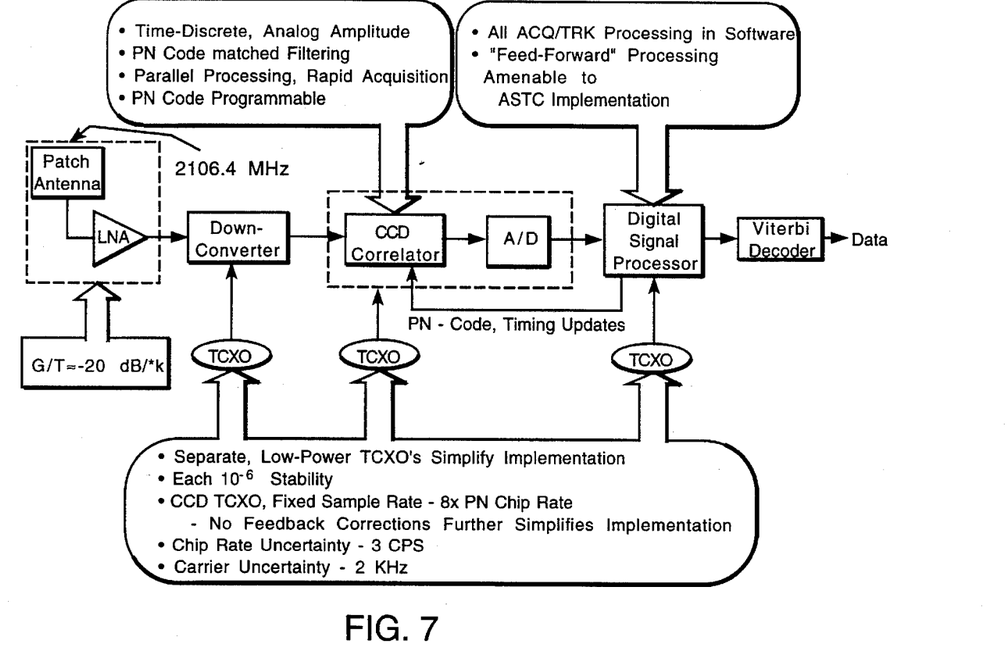
FIG. 7 is an example of an integrated receiver embodiment of the invention designed for a CDMA application.

Once the recovered waveform exits the CCD, it is digitized and buffered. The demodulated signal samples are then selectively collected by the DSP. The DSP then processes the samples according to its acquisition and tracking algorithms. FIGS. 8–11 disclose novel and very efficient set of algorithms which permit use of a common set of recovered samples so as to simplify the hardware design while achieving excellent receiver performance. In a spread spectrum application, the receiver would first execute its PN acquisition routine followed by carrier acquisition. Once signal acquisition were completed, these routines could be disabled and the tracking routines enabled. At this point all three tracking loops begin to close in on the received signal. FIGS. 6a, 6c and 6c illustrate the ability of the IR to perform this task. Note the FIG. 6A is the first to converge thereby commencing coherent carrier tracking. Soon thereafter, the PN tracking loop (FIG. 6B) is closed and followed by the symbol sync (FIG. 6C.) Once symbol sync is attained, decoding (if present) is activated and data recovery is initiated. The net affect of this integrated process is faster signal recovery at the start of a service interval while making efficient use of the receiver circuitry.

FIGS. 7 through 11 depict the architecture and signal processing for a CDMA compatible Integrated Receiver. Note that variations of this example should yield IR designs suitable for TDMA, FDMA, AM/FM and other communication schemes. The example receiver (see FIG. 7) operates at S-band with a 3 MCPS PN code rate and BPSK modulation. The use of fixed clocks (thermally controlled crystal oscillatory TCXO) is emphasized in this example so as to reduce synthesizer complexity and to restrict the digital signal processor to a single block to support circuit integration objectives.

Figure 8:
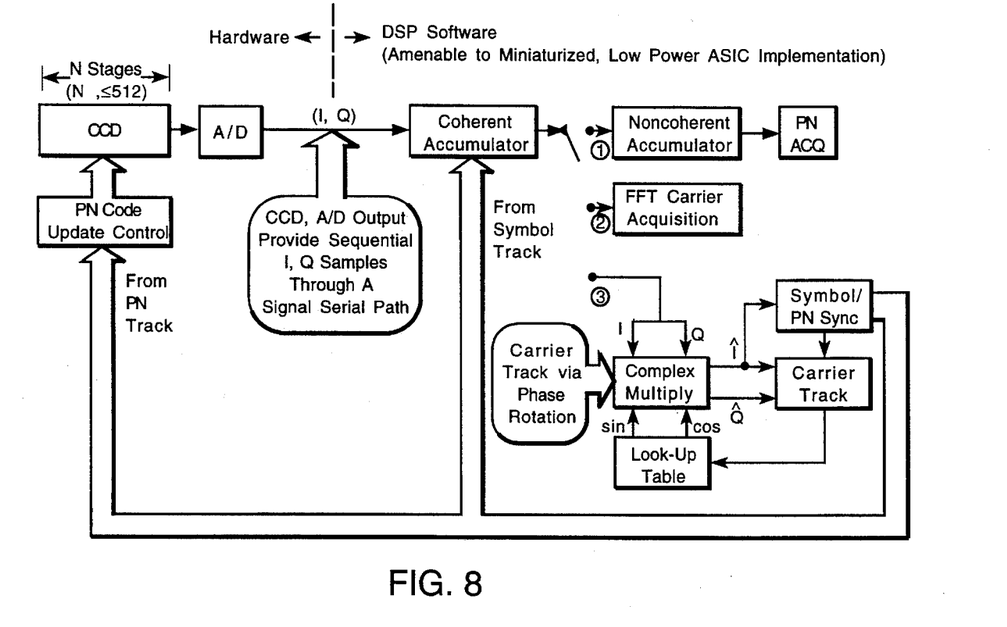
FIG. 8 is an overview of the signal processing performed by another embodiment receiver.
Figure 9:
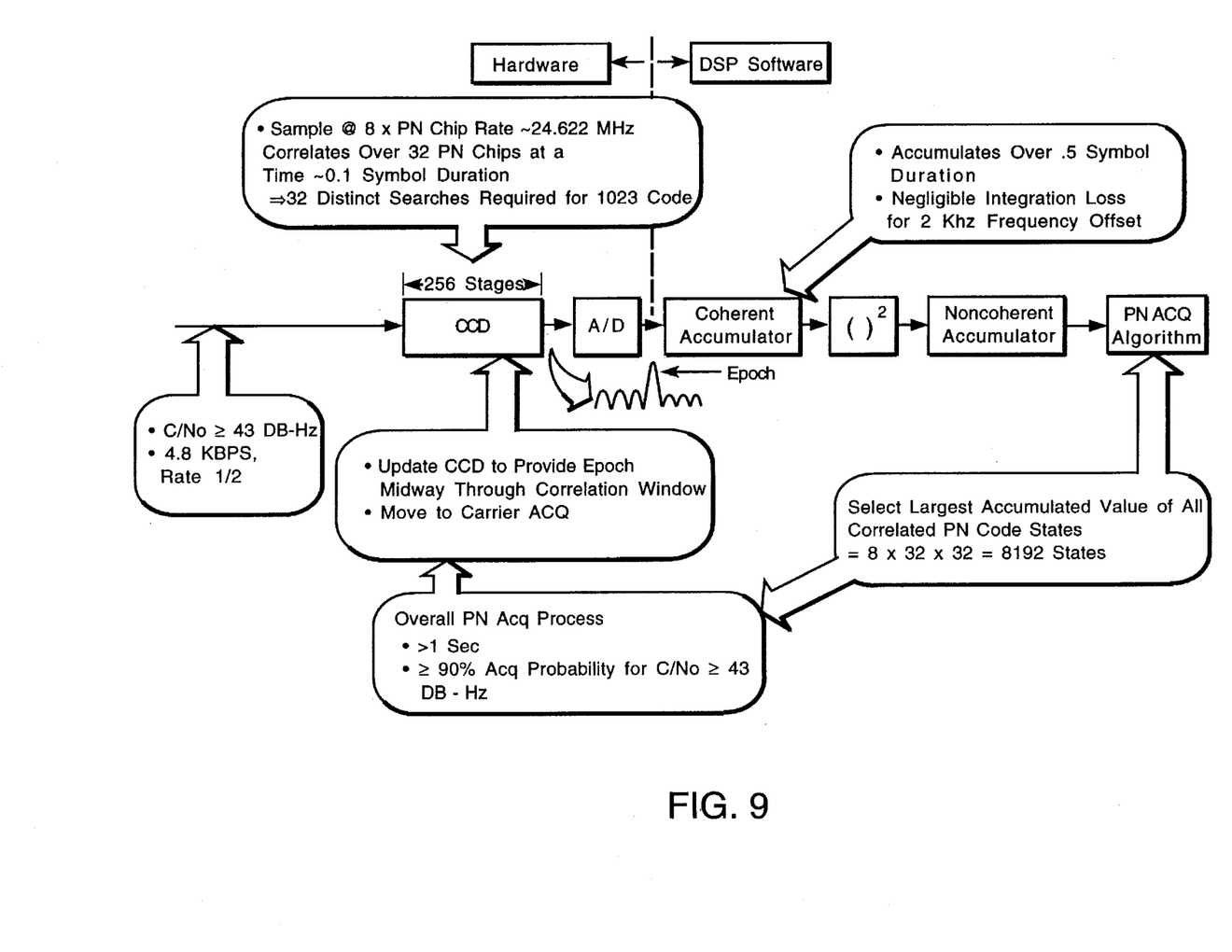
FIG. 9 illustrates the PN acquisition processing performed by receiver incorporating the invention.

An overview of the signal processing for the CDMA receiver examples is illustrated in FIG. 8. Note that the processing sequence discussed earlier is followed in this example: PN acquisition, carrier acquisition and finally signal tracking. The PN acquisition process is greatly aided by the CCD. In this example (see FIG. 9), the recovered waveform is sampled at 8 times the PN chip rate. The sample rate is application dependent. Samples rates of twice the chip rate are typical for many applications. The resolution resulting from this sampling yields uncertainty of 1/16th of a chip. The samples are collected in a 256 stage accumulation for coherent accumulation over a half symbol duration. The results of coherent accumulation then pass through a squaring operation (to remove sign) and are then accumulated non-coherently. Finally, the PN acquisition algorithm selects the largest value of all the correlated states.

Figure 10:
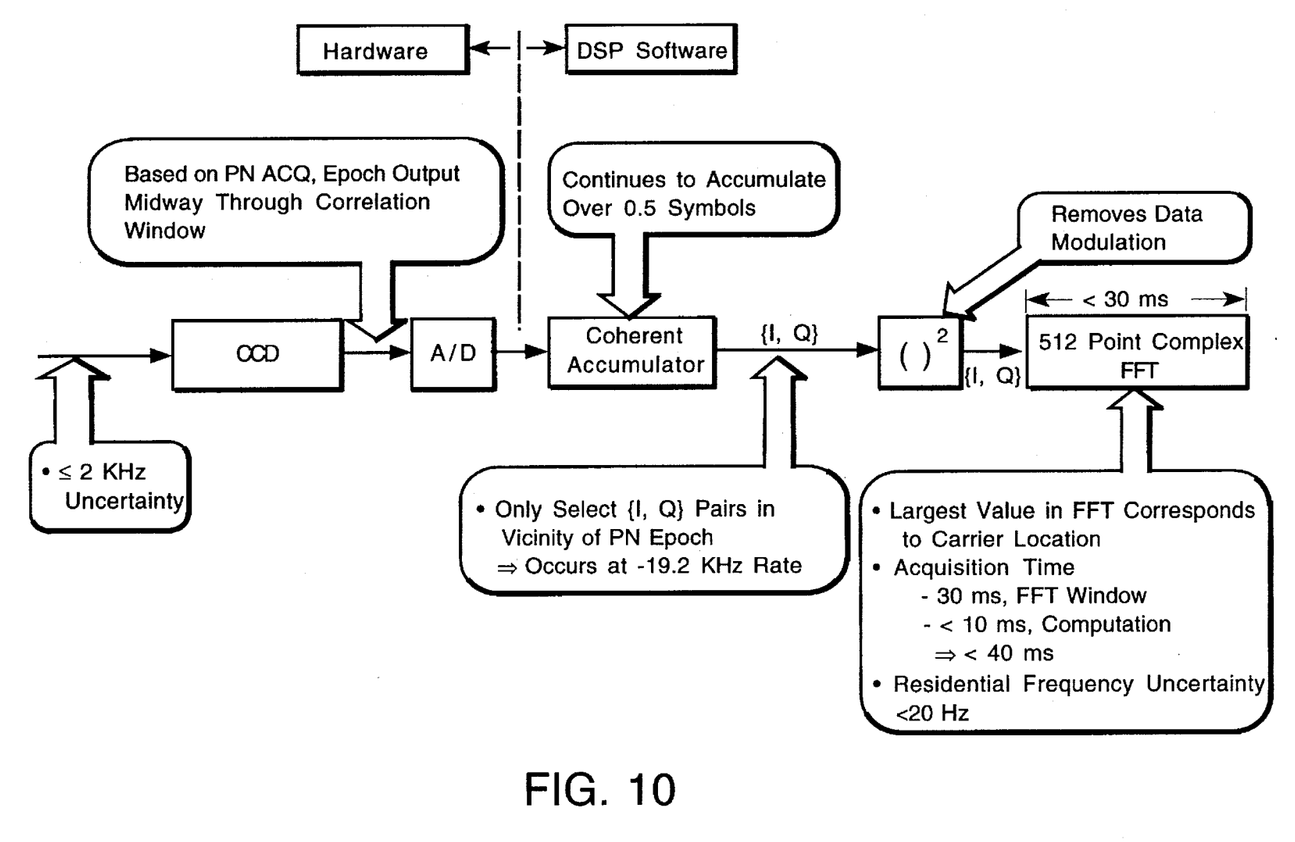
FIG. 10 illustrates the carrier acquisition processing performed by the example receiver incorporating the invention.

Carrier acquisition is initiated following completion of the PN acquisition process. Inphase (I) and quadrature (Q) samples are collected and squared to remove the data modulation envelope. An FFT of the samples is then taken and the peak of the resulting spectrum is used to identify the location of the carrier. FIG. 10 depicts this process.

Figure 11:
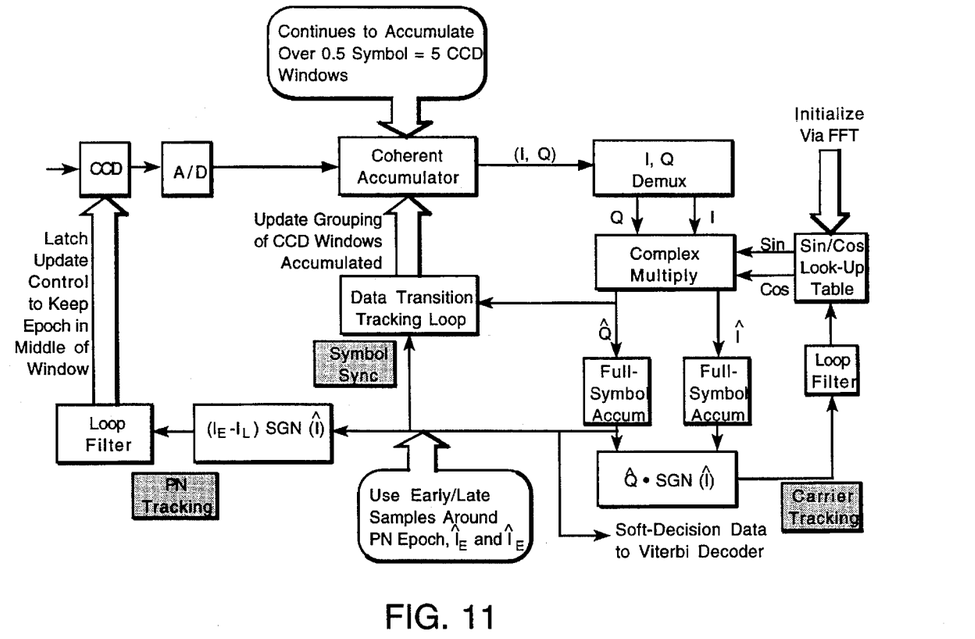
FIG. 11 illustrates the tracking signal processing performed by the example receiver incorporating the invention.
Figure 12:
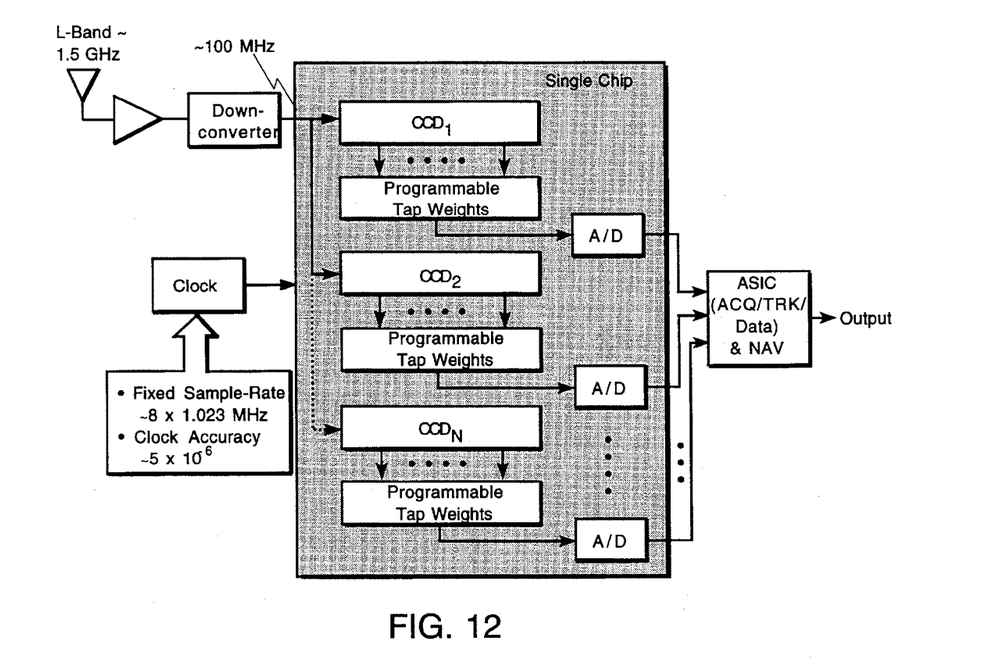
FIG. 12 is a block diagram of a CCD-based, multichannel GPS receiver incorporating the invention.
Figure 13:
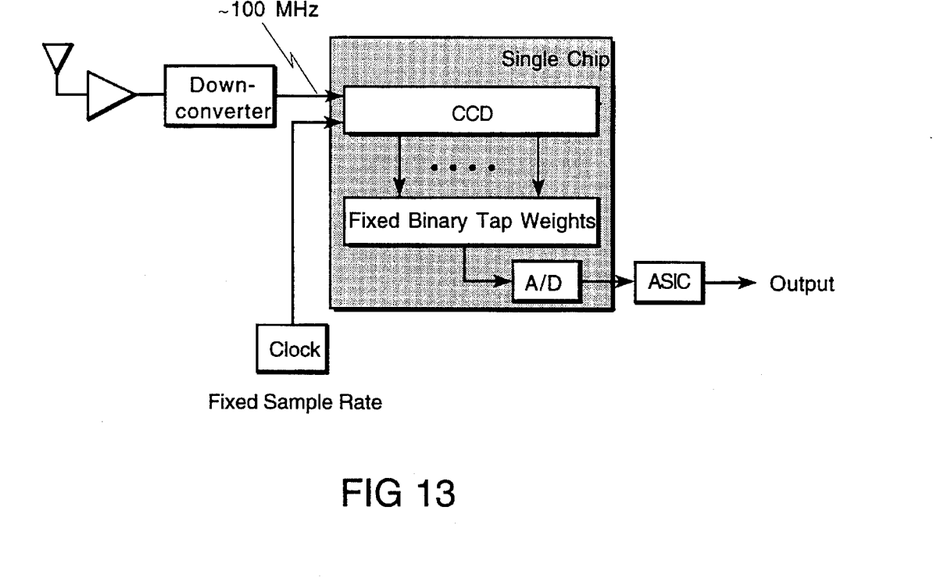
FIG. 13 is a block diagram of a CCD-based, single channel direct-sequence receiver incorporating the invention.
Figure 14:
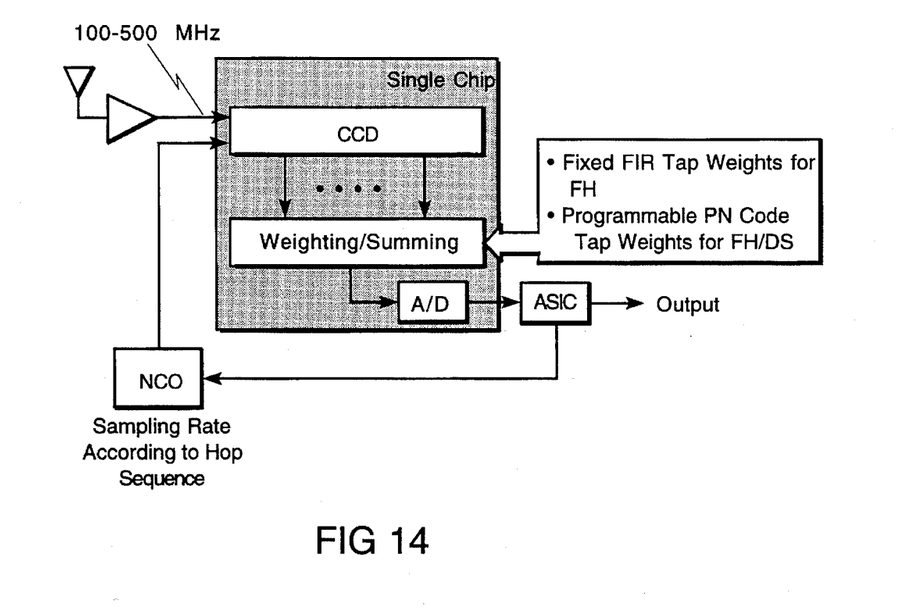
FIG. 14 is a block diagram of a CCD-based FH or FH/DS receiver incorporating the invention.
Figure 15:
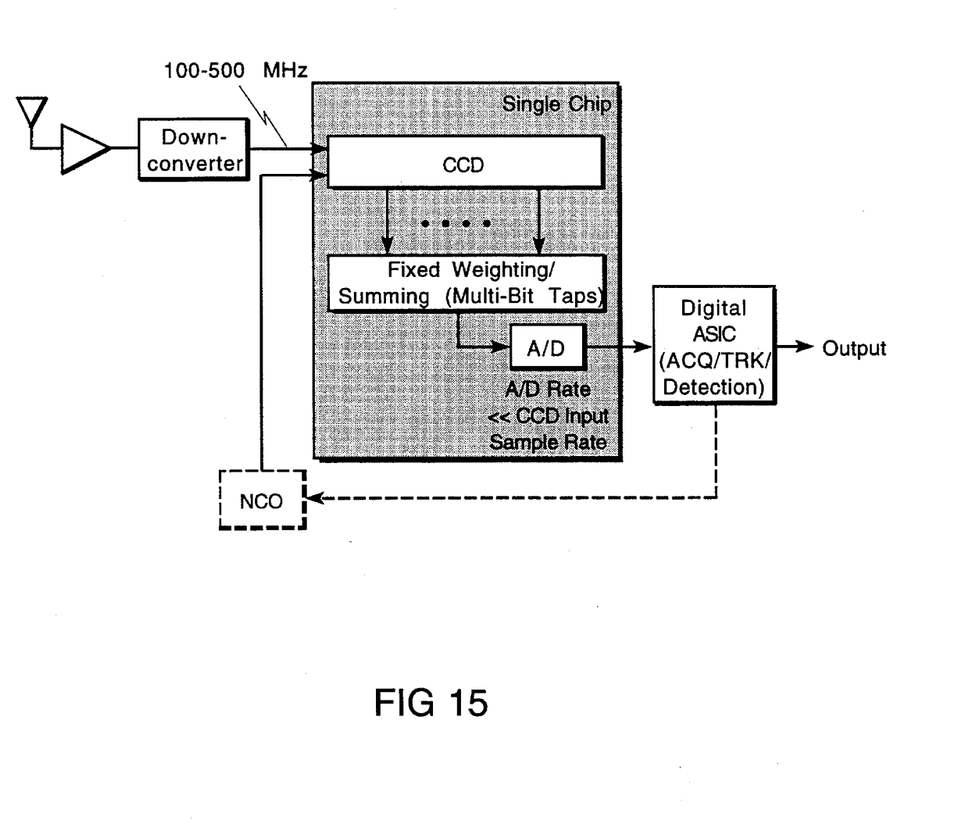
FIG. 15 is a block diagram of a CCD-based digital modem incorporating the invention.

Once the signal is acquired, signal tracking is initiated. FIG. 11 illustrates this process. Note that the same I, Q samples used for acquisition are used by all three tracking loops. These samples are first coherently accumulated with the duration of the accumulation determined by the data tracking loop. Output of the accumulator is passed to the complex multiplier where output from a sine/cosine look-up table is used to mix with the samples. This removes the residual carrier and phase components in the recovered signal and yields coherent inphase and quadrature signals. Full symbol accumulation is then performed with the symbol samples distributed to each of the three loops. A Q times sign of I discriminator is used for carrier tracking while a DTTL is used for symbol tracking. The PN tracking loop uses the system's resolution of 1/16th of a chip to direct its operation. Updates to the local PN clock are made in increments of 1/8th chip duration. The updated local PN clock is used to generate the local code and sample clock which are passed back to the CCD.

Other examples of Integrated Receiver Application are depicted in FIGS. 12–15. Multichannel applications such as GPS (see FIG. 12) are very appropriate for CCD-based Integrated Receiver designs incorporating the invention. Very simple direct sequence (DS) spread spectrum applications (see FIG. 13) are, as discussed in the earlier example, well suited for the IR of this invention. Frequency hopped (FH) or FH/DS receivers (see FIG. 15) may also be developed with the IR approach. Flexible modem design (see FIG. 15) can also be handled according to the invention.

Transmitter design can also benefit from the CCD filtering capability. The CCD can filter, modulate, tune, spread, and amplify/attenuate the signal for the purpose of generating a waveform for supplying to a power amplifier and antenna for transmission.

While preferred embodiments of the invention have been shown and illustrated, it will be appreciated that other embodiments will be readily apparent to those skilled in the art and be encompassed by the claims appended hereto.

What is claimed is:

1. A receiver for receiving and processing communication, sonar, and radar signals, comprising:

means for receiving said signals and producing an analog electrical signal corresponding thereto, an integrated circuit-chip having:

1) a CCD portion connected to receive said analog electrical signal and efficiently reduces and replace selected RF components, selected from mixers, filters, and correlators, and efficiently process wide bandwidth signals and selected ones of the following functions:

a. demodulate b. filter, c. store samples, d. decimate, e. despread, f. frequency translation, g. tune, h. amplify/attenuate, and 2) an analog-to-digital (A/D) converter, portion, and a digital signal processor connected to said A/D converter that integrates all synchronization functions in a single chip with significantly reduced power consumption due to the CCD signal processing.

2. A receiver for receiving and processing communication, sonar, and radar signals, comprising:

means for receiving said signals and producing an analog electrical signal corresponding thereto, a integrated circuit-chip having:

1) a CCD portion connected to receive said analog electrical signals and efficiently reduces and replace selected RF components selected from mixers, filters, and correlators currently employed in conventional receivers, and efficiently process wide bandwidth signals, and perform at least two of the following functions:

a. demodulate, b. filter, c. store samples, d. decimate, e. despread, f. frequency translation, g. tune, h. amplify/attenuate, and 2) an analog-to-digital (A/D) converter, and a utilization device connected to said A/D converter.

3. The receiver defined in claim 2 including a digital signal processor that integrates all synchronization functions in a single chip with significantly reduced power consumption due to the CCD signal processing.

4. A receiver for receiving and processing communication, sonar, and radar signals, comprising:

means for receiving said signals and producing an analog electrical signal corresponding thereto, a single integrated circuit-chip having:

1) a CCD portion connected to receive said analog electrical signals and constructed to perform at least two of the following functions:

a. demodulate, b. filter, c. store samples, d. decimate, e. despread, f. frequency translation, g. tune, h. amplify/attenuate, 2) an analog-to-digital (A/D) converter portion, and a utilization device connected to said A/D converter.

5. The receiver defined in claim 4 wherein said CCD portion includes a CCD matched filter to reduce or eliminate RF/IF circuitry, decimate and provide sample-and-hold, and filtering to said electrical signals.

6. The receiver defined in claim 4 wherein said CCD portion is constructed to perform RF to baseband conversion by sampling at a rate commensurate with the nyquist bandwidth but sub-sampling relative to the RF carrier frequency.

7. The receiver defined in claim 4 wherein said CCD portion is constructed to use a common sample set to achieve signal acquisition and tracking.

8. The receiver defined in claim 4 including a CCD adjustable clock and tap weight update means in conjunction with IF sampling to:

a) achieving PN code alignment, b) achieving carrier alignment, and c) achieving symbol synchronization.

9. The receiver defined in claim 3 wherein said utilization device includes a digital signal processor and said CCD portion includes a matched filter portion and means for IF sampling with the matched filter and programming said digital signal processor to provide an output that can be used for detecting signals of both digital and analog modulation types.

10. The receiver defined in claim 9, constructed for use in a search and rescue application, said CCD portion being constructed to act as a spread spectrum receiver for passing digital messages via satellite during a search operation and then be reconfigured to handle line of sight FM voice communications during the rescue phase, and signaling structures through the course of the search and rescue mission constructed to be very diverse so that much of the same circuitry could be used in all instances so as to realize an extremely efficient and capable design.

11. The receiver defined in claim 4 wherein said CCD portion is adapted for PN tracking by over-sampling relative to the chip rate and updating the tracking loop in fractions of a chip duration.

12. A radio transmitter comprised of a single chip having a CCD portion constructed to filter, modulate, tune, spread, amplify and attenuate a signal and generate a waveform for transmission, and a power amplifier and antennae for receiving said waveform and transmission.

* * * * *